United States Patent [19]

Nezworski

[11] 4,273,151
[45] Jun. 16, 1981

[54] IN-LINE RELIEF VALVE

[75] Inventor: James E. Nezworski, Milwaukee, Wis.

[73] Assignee: The Perlick Company, Inc., Milwaukee, Wis.

[21] Appl. No.: 81,698

[22] Filed: Oct. 4, 1979

[51] Int. Cl.³ .......................................... G05D 11/00
[52] U.S. Cl. .................................................... 137/115
[58] Field of Search ............... 137/115, 116, 540, 542, 137/543.13, 469; 251/331, 332

[56] References Cited

U.S. PATENT DOCUMENTS

| | | | |
|---|---|---|---|
| 904,984 | 11/1908 | Ofeldt | 137/115 |
| 3,200,839 | 8/1965 | Gallagher | 251/332 |
| 3,279,749 | 10/1966 | Fleckenstein et al. | 251/331 |
| 3,307,568 | 7/1967 | Gartner | 137/115 |
| 3,520,321 | 7/1970 | Skoli et al. | 137/116 |
| 3,606,908 | 9/1971 | Riester | 137/116 |
| 3,636,969 | 1/1972 | Jacobellis | 137/115 |
| 3,918,470 | 11/1975 | Jacobellis | 137/115 |
| 4,168,723 | 9/1979 | Schneider | 137/542 |

FOREIGN PATENT DOCUMENTS

| | | | |
|---|---|---|---|
| 2351202 | 4/1975 | Fed. Rep. of Germany | 137/115 |
| 2397578 | 2/1979 | France | 137/116 |

Primary Examiner—William R. Cline
Assistant Examiner—H. Jay Spiegel
Attorney, Agent, or Firm—James E. Nilles; James R. Custin

[57] ABSTRACT

A safety relief valve especially suitable for connection in a pressure gas system for beverage dispensing equipment has a body that defines a vented cylindrical valve cage and a coaxial annular valve seat at one end of the cage with an annular seating surface that faces axially into the cage. A pressure chamber in the body is communicable with the valve cage through the valve seat. A valve element, coaxially movable in the valve cage, is biased towards engagement with the seating surface and presents a pressure surface to the pressure chamber. Opposite tubular nipple portions of the body have bores that are symmetrical to the valve cage axis and communicate at their inner ends with the pressure chamber, said inner ends being separated by a baffle which is symmetrical to said axis and projects into the pressure chamber from the side thereof opposite the valve seat. Pressure fluid flowing into either nipple is deflected by the baffle towards the pressure surface to impose impact pressure thereon, hence the valve cannot be connected backwards.

6 Claims, 2 Drawing Figures

IN-LINE RELIEF VALVE

FIELD OF THE INVENTION

This invention relates to safety relief valves for fluid pressure systems and is more particularly concerned with an in-line safety relief valve that can be connected in a duct through which pressure fluid flows from a source towards a receptacle, to prevent pressure in the receptacle and in downstream portions of the duct from rising above a predetermined value.

BACKGROUND OF THE PRIOR ART

The problems that are solved by the present invention may be encountered in many situations, but they are perhaps best understood by reference to a typical and rather familiar example.

In a tavern that serves draft beer, one or more kegs of beer are kept in a cooler at some distance from the tap at the bar, and beer flows from a keg to the tap through a beverage duct or so-called beer line. To force beer out of the keg and through the beer line, the interior of the keg is pressurized with compressed air, nitrogen or carbon dioxide gas that is metered into the keg from a compressor or tank. In the case of carbon dioxide, the gas pressure in a freshly charged tank is on the order of several hundred pounds per square inch typically ten times the ambient temperature in degrees F. Although compressed air and nitrogen may be at lower source pressures, all of these gases are under substantially higher pressure than is desired in the interior of a keg, which should be pressurized only to about 20 to 30 p.s.i. In flowing from the source to the keg, the gas is therefore passed through at least one pressure reducing valve. With stored pressure gas there is usually a two-stage pressure reduction system comprising a first-stage regulator at the gas tank outlet and a second-stage regulator near the keg or at a keg manifold connected with plural kegs.

Of course pressure reducing valves are normally very reliable, but they have been known to fail. If the full pressure of gas from a carbon dioxide tank were charged into a keg as the result of such failure, the keg would explode violently. In the absence of a safety device, failure of only a first-stage regulator in a two-stage system would probably be less disastrous, but could rupture the pressure gas duct. As an essential safety precaution, therefore, it has become virtually mandatory to incorporate at least one overpressure relief device into the pressure gas system of every beverage dispensing installation of the type just described, including wine and soda dispensing systems as well as draft beer systems. Existing safety codes recommend two such devices, one located at the outlet of the primary regulator, the other at a point in the gas system that is a little distance upstream from the kegs or product tanks.

One such overpressure relief device heretofore available comprised a rupture disc of aluminum foil or the like, sealed across an opening in the gas pressure system and intended to be broken by gas pressure in excess of a predetermined value. Once ruptured by an overpressure, the disc of course had to be replaced, and this occasioned a certain amount of inconvenience. Furthermore, rupture of the disc usually resulted in loss of substantially the entire contents of the pressure gas tank. Another significant disadvantage of the rupture disc was that there was no way of testing it without destroying it.

Obviously these disadvantages of a rupture disc safety device are not present in a pressure relief valve that opens in response to pressure above a predetermined value and automatically reseats itself when pressure drops below that value. The pressure at which such a device opens can be readily checked and adjusted without destroying or harming it.

Heretofore, however, no satisfactory safety relief valve has been available for beverage dispensing gas systems, even though innumerable relief valves have been devised for other types of systems. One reason for this anomaly is that most prior pressure relief valves were intended to be mounted at a location to be protected, to be subjected to the static pressure of fluid at that location, as in the case of a steam boiler safety valve which is connected into the boiler itself. In a sense, the keg or beverage tank in a beverage dispensing system constitutes a location to be protected, but it is not practical to install a safety valve in the keg itself. Furthermore, there is also a substantial length of ducting which extends to the key from the pressure gas source, and that ducting must also be protected against rupture by an overpressure. In particular, the duct that extends between a primary and a secondary pressure regulator normally includes no plenum at which a conventional safety relief valve could be mounted.

It can be seen that a safety valve for the gas system of beverage dispensing equipment must perform a somewhat different function than a conventional safety valve, in that it must be responsive to conditions at some distance downstream from where it is mounted, and it must be mounted at a location at which there is a flow of gas past it, rather than being subjected substantially only to the pressure of non-flowing fluid. As is well known, a rapidly flowing gas tends to exert a low static pressure on surfaces along which it flows. Because of this, a conventional safety relief valve, connected in the pressure gas system of beverage equipment, would not serve to protect the system because there would be an increasing gas flow rate past it at those times when it should be opening to relieve pressure. Such a safety valve would remain closed until pressure at the downstream end of the gas duct had increased to near-equality with pressure at the source, causing a wave of static pressure to be reflected back along the duct.

A safety device for connection in the gas system of beverage dispensing equipment should desirably meet certain structural limitations, especially if it is to be adapted for retro-fitting into existing equipment as well as for incorporation into new equipment. It must of course be sturdy, inexpensive and compact. In addition, for maximum installation versatility, it should be connectable for effectively in-line gas flow; that is, it should have inlet and outlet nipples that project in opposite directions and are preferabably coaxial with one another. It will be apparent that provision for such in-line connection is not easily reconcilable with the rather unusual functional requirements imposed upon a safety valve for a beverage dispensing pressure gas system. Prior safety devices for such systems were usually arranged to bring system gas flow to a dead-end point, and there tends to be an inherent incompatability between an arrangement that provides for such dead-ended flow and one that provides for effectively straight-through or in-line flow.

The provision of coaxial, oppositely projecting inlet and outlet nipples brings another problem in its wake, particularly with respect to a safety relief valve intended to be retro-fitted into existing systems and which must therefore be connected between other units in such systems. If a particular one of the nipples must always be connected as an inlet and the other as an outlet in order for the device to perform its safety function, then there is always a chance for the device to be incorrectly installed, with possibly disastrous results. The best insurance against such a safety valve being connected backwards is to arrange it so that it is incapable of being installed backwards; that is, it should be satisfactorily connectable with either of its nipples used as its inlet and the other as its outlet.

One other requirement is substantially peculiar to beverage dispensing equipment. Any unit in such a system is susceptible to having a relatively sticky substance sprayed or spilled onto it, in addition to being exposed to other types of foreign matter that may be present in an uncontrolled environment. Obviously these possibilities have to be taken into account in the design of the device.

It will be apparent that the provision of a completely satisfactory pressure relief safety valve for the pressure gas system of beverage dispensing equipment presents a complex of problems. When these problems are fully understood, individually and in their relationship to one another, it is understandable that there has not heretofore been a satisfactory safety valve for such a system, notwithstanding the well-developed state of the art relating to safety valves generally. The need has been evident enough, but it has been far from obvious how that need could be fully satisfied.

SUMMARY OF THE INVENTION

In general, it is the subject of this invention to provide an in-line safety valve which satisfies all of the functional and installation requirements set forth above and which is well suited for tavern beer gas systems, as well as for many other types of installations, by reason of its being simple, sturdy and inexpensive.

Thus, more specifically, it is an object of this invention to provide a safety device for beverage dispensing gas systems and the like which can function satisfactorily when installed a substantial distance upstream from a protected location, can perform repeated pressure relieving operations without being destroyed, automatically resets itself after each such operation, and is suitable both for retro-fit and new installations by reason of having coaxial, oppositely projecting nipples, either of which can serve as an inlet while the other serves as an outlet.

Another and more specific object of the invention is to provide a relief valve of the character described that can be readily tested from time to time for assurance that its valve element has not adhered to its seat.

A further specific object of the invention is to provide a relief valve having a valve element that makes a metal-to-metal contact with its seat whereby most of the biasing force on the valve element is taken up, but wherein there is nevertheless a resilient sealing ring whereby a leak-proof seal around the valve element is normally maintained without the imposition of forces upon the resilient sealing means that would cause it to cold-weld itself to adjacent metal and form a bond between the valve element and the seat that would interfere with proper valve operation.

It is also a specific object of the invention to provide a relief valve of the character described that has a very positive pressure relieving operation by reason of its valve element being so formed that upon its initial partial opening in response to fluid pressure, the effective area of the pressure responsive valve element is increased, to ensure further movement of the valve element away from its seat to a fully open position.

In general, the objects of the invention are achieved in a safety relief valve that is connectable between a source of fluid under pressure and a location to which fluid flows from said source, and whereby pressure at said location is prevented from exceeding a predetermined value. The relief valve of this invention has a body that defines a vented valve cage having an axis, a coaxial annular valve seat at one end of said valve cage having an annular seating surface that faces into the valve cage, a pressure chamber communicable with the valve cage through the valve seat, and a pair of tubular nipple portions having bores which extend into the body from opposite sides of said axis, in substantially symmetrical relation thereto, and which are communicated with the pressure chamber at their inner ends. A coaxial valve element in the valve cage is movable axially to and from a closed position engaging said annular seating surface, and said valve element has a pressure surface which faces into the pressure chamber through the valve seat and is yieldingly biased towards its closed position. There is a baffle in the body that projects into the pressure chamber substantially parallel to said axis and from the side of the pressure chamber that is opposite the valve seat. Said baffle is symmetrical to said axis and is between the inner ends of said bores at their respective communications with the pressure chamber, so that pressure fluid which flows into the body through either of said bores is deflected towards said pressure surface by the baffle and thus imposes impact pressure upon said pressure surface.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
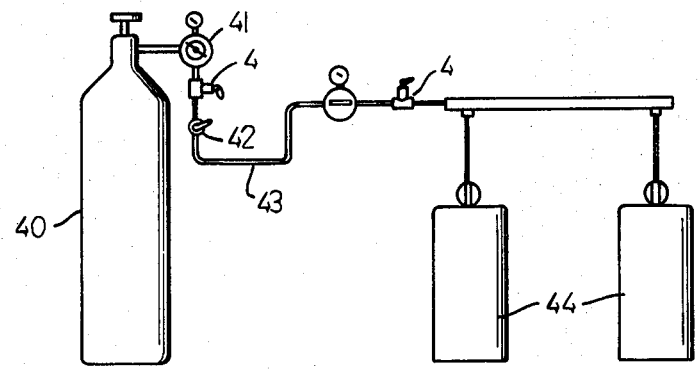
FIG. 1 is a diagrammatic view of a beverage dispensing gas system having relief valves of this invention installed therein.
Figure 2:
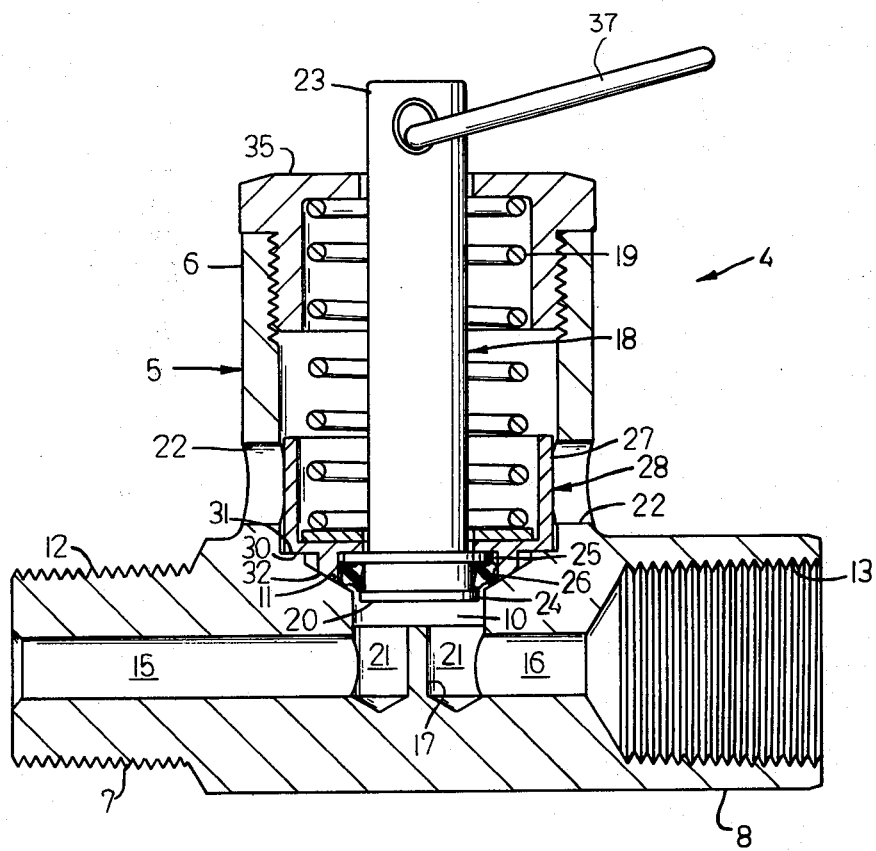
FIG. 2 is a view in longitudinal section of a safety relief valve embodying the principles of this invention.

Referring now to the accompanying drawings, the numeral 4 designates a valve of this invention, which has a generally T-shaped body 5 that can comprise a unitary casting. As shown, the body 5 has one outwardly projecting portion that comprises a vented cylindrical valve cage 6 and has coaxial, oppositely projecting tubular nipple portions 7 and 8 that have a common axis transverse to the axis of the valve cage 6. The central portion 9 of the body 5, comprising the junction of its valve cage and nipple portions, defines a pressure chamber 10 that is communicated with the interior of the valve cage 6 through an annular valve seat 11.

One of the tubular nipple portions 7 is shown with an external thread 12 while the other is shown with an internal thread 13; but as the description proceeds it will be apparent that both nipple portions could be internally threaded or both could be externally threaded, in accordance with installation convenience. Because of the coaxial, oppositely projecting arrangement of the nipple portions 7 and 8, the body 5 lends itself nicely to installation in both new and existing gas systems for beverage dispensing apparatus, at whatever point in the system is considered desirable from the standpoint of safety and convenience. Thus, in a typical draft beer gas system, a safety valve 4 of this invention can be installed near a pressure gas tank 40, in a direct connection between a primary pressure regulator 41 which is directly connected to the tank and a manual shut-off valve 42 which is in turn connected to a gas duct 43 that leads toward the keg or kegs 44; and in such an installation the safety valve 4 of this invention forms a compact and rigid subassembly with the pressure regulator 41 and the shut-off valve 42.

Either of the tubular nipple portions 7 and 8 can comprise the inlet to the valve body 5 while the other serves as its outlet, because (apart from possibly different threads on the respective nipples 7 and 8) the body 5 is completely symetrical to a transverse plane that is normal to the coinciding axes of the nipple portions 7 and 8 and contains the axis of the valve cage 6; and the body 5 is also symmetrical to a longitudinal plane that contains the several axes of the valve cage and nipple portions. Thus the annular valve seat 11, which can be formed integrally with the body 5, is concentric to the cylindrical valve cage 6, and coaxial bores 15 and 16 in the respective nipple portions 7 and 8 terminate at a baffle 17 which extends transversely to them and is likewise symmetrical to the axis of the valve cage 6.

The valve seat 11, which is at the inner end of the valve cage 6, has coaxial annular seating surfaces, as described hereinafter, that face generally into the valve cage. The valve seat 11 is normally engaged by a coaxial plunger-like valve element 18 that is axially slidable in the valve cage 6 and is biased towards the seat 11 by a coiled expansion spring 19 in the valve cage.

The valve element 18 and the valve seat 11 are at one side of the pressure chamber 10, and the baffle 17 projects towards them from the opposite side of the pressure chamber. The opening through the valve seat 11 is substantially wider than the distance across the baffle 17, and therefore the valve element 18 presents, at its inner end, a pressure surface 20 which faces into the pressure chamber 10 through the valve seat 11 and which extends across the baffle 17 but is always spaced from it. It will be seen that the pressure surface 20 is exposed to pressure fluid in the pressure chamber 10, whereby a force is exerted upon the valve element 18 that opposes the biasing force of the spring 19 and tends to move the valve element off of its seat 11.

Because of the manner in which the bores 15 and 16 in the respective nipples 7 and 8 are communicated with the pressure chamber 10, gas or other pressure fluid that flows through the valve body 5 tends to impose an impact pressure upon the valve element pressure surface 20, regardless of whether such fluid flows into the body 5 through the nipple 7 and out through the nipple 8 or vice versa. Specifically, the nipple bores 15 and 16 have their inner ends spaced apart by a small distance, and from the inner end of each of those bores a short lateral passage portion 21, extending parallel to the axis of the cylindrical valve cage 6, opens into the pressure chamber 10 at the side thereof opposite the valve element pressure surface 20. Consistently with the symmetry of the body 5, the passage portions 21 are spaced equal small distances to opposite sides of the coinciding axes of the valve seat 11 and valve cage 6, and the septum between them comprises the baffle 17.

It will be apparent that the valve element 18 is forced off of its seat to an open position when the force exerted by fluid pressure acting upon its pressure surface 20 exceeds the biasing force of the spring 19; hence the force of that spring predetermines the pressure value at which the valve will vent fluid from a system in which it is connected. Fluid that flows past the open valve element 18, through the valve seat 11 from the pressure chamber 10 into the valve cage 6, is vented from the valve cage through vent ports 22 in its cylindrical wall that are preferably axially outwardly adjacent to the valve seat 11. Of course the valve element 18 automatically reseats itself as soon as fluid pressure drops below the predetermined relief value.

When normal pressure conditions exist, fluid must first make a right-angle bend in flowing from the inlet bore 15 or 16 into its connected passage portion 21, and must then follow a substantially U-shaped course in flowing out of that passage portion 21, through the pressure chamber 10, and into the other passage portion 21; after which the fluid must again make another right-angle bend in flowing into the outlet bore 16 or 15. This rather tortuous path that pressure fluid takes in flowing through the relief valve of this invention undoubtedly produces some pressure drop across the valve, especially at relatively high flow rates. However, this throttling effect is not necessarily undesirable; in fact, in a beverage dispensing gas system it can be definitely advantageous inasmuch as there must in any case be a substantial pressure reduction between the pressure gas source and the keg or beverage tank to which the gas is flowing. In other installations, where substantial pressure drop across the relief valve is undesirable, the device can simply be enlarged as necessary to reduce its throttling effect to an acceptable value.

As shown, the valve element 18 comprises a rod-like stem 23 that is somewhat longer than the cylindrical valve cage 6 and projects axially beyond its outer end. At its inner end the stem 23 has a small circumferential flange 24 and, spaced a small distance axially therefrom, a larger flange 25. Confined between these flanges 24 and 25 is a quad ring 26 which closely encircles the stem.

The valve element 18 also comprises a generally cup-shaped member 27 that is seated on the larger flange 25 and has a central hole in its bottom wall through which the stem 23 extends with a loose fit. The cylindrical side wall 28 of the cup-shaped member 27, which projects axially outwardly in the valve cage 6, normally covers the vent ports 22 to prevent foreign matter from entering the valve cage through them, but it fits the valve cage with a small clearance to derive some guidance for its axial motion from the valve cage wall without having a tendency to bind against it.

The underside of the bottom wall of the cup-shaped member 27 has an outer marginal surface 30 that faces axially towards the pressure chamber 10 and is flat and annular to cooperate with an opposing flat, annular surface 31 on the valve seat. Radially inside the seat-engaging surface 30, the bottom wall of the cup-shaped member 27 has a concentric, frustoconical, downwardly convergent annular land 32 which has its radially inner surface engaged with the quad ring 26 so that the quad ring forms a seal between the cup-shaped member 27 and the stem 23. When the valve element 18 is seated, the quad ring 26 engages an annular frustoconical surface 34 of the valve seat that is radially inside the flat, annular seat surface 31 and converges towards the pressure chamber 10. Although the quad ring 26 makes a seal with this frustoconical valve seat surface 34 when the valve element 18 is fully seated, the force that the spring 19 exerts against the valve element is mainly imposed upon the flat annular surfaces 30 and 31, which have metal-to-metal contact with one another, and therefore the quad ring 26 is compressed against the valve seat surface 32 with only a light force, sufficient for sealing purposes but not so great as to cause the quad ring to weld itself to that metal surface 34.

The hole in the bottom of the cup-shaped member 27 is somewhat larger than the stem 23 that extends therethrough so that, under the biasing force of the spring 19, the cup-shaped member can tilt relative to the stem for firm flatwise seating of its flat surface 30 against the opposing flat valve seat surface 31.

It will be apparent that when the valve element 18 is fully seated, the area of its pressure surface 20 that receives the force of pressure fluid in the pressure chamber 10 is approximately defined by the perimeter of the quad ring 26. However, as soon as pressure fluid unseats the valve element sufficiently to disengage the quad ring 26 from its opposing frustoconical seat surface 34, the effective valve element surface acted upon by the pressure fluid increases, being then defined by the perimeter of the cup-shaped member 27. This ensures a prompt and adequate opening of the valve element 18 when pressure fluid must be vented to relieve an overpressure.

At its axially outer end the coiled expansion spring 19 reacts against an inverted cup-shaped cap 35 that closes the outer end of the valve cage 6 and preferably has a threaded connection with it. The cap 35 has a relatively large central hole through which the stem 23 of the valve element projects, and which also serves as an additional vent port for the valve cage 6. At its axially inner end the spring 19 bears against a washer 36 that overlies the bottom wall of the cup-shaped member 27 and surrounds the stem 23.

The outer end portion of the stem 23 has a transverse hole therethrough in which there is received a ring 37 that prevents the cap 35 from being displaced axially off of the stem 23 under the force of the spring 19 when the cap 35 is out of the valve cage 6. The cap 35, the valve member assembly 23, 27, and the spring 19 thus comprise a subassembly which is held together by the ring 37.

The ring 37 also serves as an actuator by which the valve element 18 can be momentarily moved off of its seat for a test of the operativeness of the device. For that purpose the ring 37 functions as a lever, being engaged for actuation at a point diametrically opposite its connection with the stem 23 and being fulcrumed on the edge of the cap 35 to move the stem 23 axially outwardly.

Although the safety relief valve of this invention is herein shown and described in a preferred form in which its nipple portions are in line with one another, it will be apparent that the invention also lends itself to a valve body having its nipples at an angle of, for example 90° or 135° to one another. In such cases, as in the embodiment herein illustrated, the axes of the nipples would be disposed at equal and opposite angles to the axis of the valve cage, and the passage portions extending between the nipple bores and the pressure chamber would again be parallel to the valve cage axis and spaced small distances to opposite sides thereof. With its nipple portions so disposed, the valve would still have the symmetry to the valve cage axis that would enable it to be installed with either of its nipples as its inlet while the other serves as its outlet.

From the foregoing description taken with the accompanying drawings it will be apparent that this invention provides an in-line safety relief valve that is connectable between a source of pressure fluid and a pressurized receptacle to which the pressure fluid flows; and it will also be apparent that the safety valve of this invention, although simple and inexpensive, has several features which ensure its reliability, including an inherent capability for accommodating flow through it in either direction so that it cannot be installed backwards.

I claim:

1. A safety relief valve that is connectable between a source of fluid under pressure and a location to which fluid flows from said source, and whereby pressure at said location is prevented from exceeding a predetermined value, said relief valve being characterized by:
   A. a body that defines
      (1) a vented valve cage having an axis,
      (2) a pressure chamber,
      (3) an annular valve seat opening through one side of said pressure chamber to provide for communication between it and the valve cage, said valve seat being coaxial with the valve cage and having an annular seating surface that faces substantially axially into the valve cage, and
      (4) a pair of substantially tubular nipple portions, the respective bores of which extend inwardly in the body towards said pressure chamber;
   B. a coaxial valve element in said valve cage movable axially to and from a closed position in engagement with said annular seating surface, said valve element
      (1) having a pressure surface which faces into the pressure chamber through the valve seat and
      (2) being yieldingly biased towards said closed position; and
   C. said body having therein
      (1) a baffle which projects partway into said pressure chamber from the side thereof opposite said valve seat and which is thus at all times spaced from said pressure surface, and
      (2) a pair of passage portions, one for each of said bores, each communicating its bore with said pressure chamber,
         (a) said passage portions being separated from one another by said baffle but being at all times communicated with one another through said pressure chamber, and
         (b) said passage portions extending substantially parallel to the axis of the valve cage and each opening to the pressure chamber opposite said pressure surface so that pressure fluid entering the body through either of said bores exerts impact pressure upon said pressure surface as it issues from the passage portion communicated with that bore.

2. The safety relief valve of claim 1, further characterized by:
   (1) said baffle projecting into the pressure chamber in symmetrical relation to said axis of the valve cage, and (2) the bores of said nipple portions having their respective axes at opposite but substantially equal angles to the axis of the valve cage.

3. The relief valve of claim 2 wherein said nipple portions of the body project in opposite directions and are substantially coaxial with one another.

4. The relief valve of claim 1, further characterized by:
(1) said annular seating surface on the valve seat having
   (a) a larger diameter portion and
   (b) a concentric smaller diameter portion that is axially offset towards the pressure chamber in relation to said larger diameter portion; and
(2) said valve element having
   (a) a larger diameter portion which engages the larger diameter portion of said valve seat surface when the valve element is in its closed position, and
   (b) a smaller diameter portion which engages the smaller diameter portion of said valve seat surface when the valve element is in its closed position,
so that upon partial opening of the valve there is an increase in the effective area of the valve element surface upon which fluid pressure is imposed.

5. The relief valve of claim 4, further characterized by:
(1) one of said smaller diameter portions being defined by resilient means and
(2) both of said larger diameter portions being substantially hard so that their engagement limits compression of said resilient means under the biasing force upon the valve element.

6. A safety relief valve that is connectable between a source of fluid under pressure and a location to which fluid flows from said source, and whereby pressure at said location is prevented from exceeding a predetermined value, said relief valve being characterized by:
A. a body that defines
   (1) a vented valve cage having an axis,
   (2) a coaxial annular valve seat at one end of said valve cage having an annular seating surface that faces into the valve cage,
   (3) a pressure chamber having said valve seat at one side thereof and communicable with the valve cage therethrough, and
   (4) a pair of tubular nipple portions having bores which extend into the body from opposite sides of said axis, in substantially symmetrical relation thereto, and which are communicated with the pressure chamber at their inner ends;
B. a coaxial valve element in said valve cage, movable axially to and from a closed position engaging said annular seating surface, said valve element
   (1) having a pressure surface which faces into the pressure chamber through the valve seat and
   (2) being yieldingly biased towards said closed position; and
C. a baffle in the body between the inner ends of said bores, said baffle being in substantially parallel and symmetrical relationship to said axis and projecting from the side of the pressure chamber opposite the valve seat partway across the pressure chamber, to be at all times spaced from said pressure surface and permit communication through the pressure chamber between the inner ends of said bores, said baffle causing pressure fluid that flows into the body through either of said bores to be deflected towards said pressure surface to impose impact pressure thereon.

* * * * *